United States Patent Office 3,642,831
Patented Feb. 15, 1972

---

3,642,831
HYDROCARBYL EPOXIDE MANUFACTURE
Richard D. Smetana, Beacon, Harry Chafetz, Poughkeepsie, and Alfred Arkell and Matthew A. McMahon, Wappingers Falls, N.Y., assignors to Texaco Inc., New York, N.Y.
No Drawing. Filed Mar. 18, 1969, Ser. No. 808,346
Int. Cl. C07d 1/08, 1/12
U.S. Cl. 260—348.5 L                13 Claims

ABSTRACT OF THE DISCLOSURE

A method of producing an epoxide of the formula:

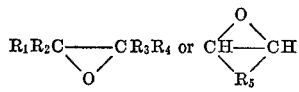

where $R_1$, $R_2$, $R_3$ and $R_4$ are hydrogen or hydrocarbyl and $R_5$ is $\alpha,\Omega$-alkylene, comprising contacting a first olefin of the formula:

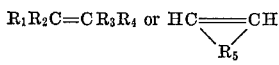

where $R_1$ through $R_5$ is as heretofore defined with a hydroperoxy alkanoate of the formula:

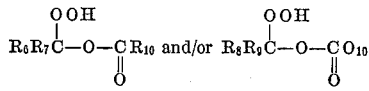

where $R_6$, $R_7$, $R_8$ and $R_9$ are hydrogen or hydrocarbyl and $R_{10}$ is alkyl of from 1 to 20 carbons in the presence of a molybdenum, tungsten or vanadium epoxide producing catalyst, said alkanoate prepared by contacting with ozone a mixture of a second olefin of the formula:

$$R_6R_7C=CR_8R_9$$

where $R_6$, $R_7$, $R_8$ and $R_9$ are as heretofore defined with an alkanoic acid of the formula $R_{10}COOH$ where $R_{10}$ is as heretofore defined.

BACKGROUND OF INVENTION

In the past, a standard means of preparing epoxides of the type contemplated herein was by contacting unsaturated alkenes, cycloalkenes and their substituted derivatives with peroxy compounds such as a peracetic, perbenzoic and monoperphthalic acid. Although this past reaction does produce epoxides, it is not entirely satisfactory regarding selectivity to epoxide formation and yield of epoxide product.

SUMMARY OF INVENTION

We have discovered a method which is more highly selective to the production of epoxides from their unsaturated precursors and hydroperoxy alkanoates and produces epoxides in yields more attractive from a commercial standpoint than many of the prior art methods.

Particularly, our method comprises contacting a first olefin of the formula:

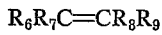

where $R_1$, $R_2$, $R_3$ and $R_4$ are hydrogen or alkyl, aryl, alkylaryl or arylalkyl of from 1 to 30 carbons with a hydroperoxy alkanoate of the formula:

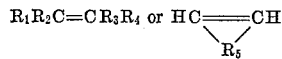

where $R_6$, $R_7$, $R_8$ and $R_9$ are hydrogen or alkyl, aryl, alkylaryl or arylalkyl of from 1 to 40 carbons in the presence of a molybdenum, tungsten or vanadium epoxide producing catalyst, said alkanoate being prepared by contacting with ozone a second olefin of the formula $$R_6R_7C=CR_8R_9$$

in the presence of an alkanoic acid of the formula $$R_{10}COOH$$

where $R_{10}$ is alkyl containing from 1 to 20 carbons.

DETAILED DESCRIPTION OF THE INVENTION

More specifically, the method of the invention comprises preparing an epoxide as heretofore defined comprising contacting a first olefin with a hydroperoxide alkanoate in the presence of between about 0.01 and 10 wt. percent, based on the reaction mixture of a transitional metal catalyst, all as heretofore defined, utilizing a mole ratio of first olefin to hydroperoxide alkanoate of between about 1:1 and 100:1 at a temperature between about 0 and 200° C. and under a pressure ranging from between about 1 to 100 atmospheres.

If needed to facilitate contact of reactants and catalysts in the epoxide formation, an inert solvent may be employed and advantageously used in quantities of between about 50 and 95 wt. percent based on the reaction mixture. Suitable examples are liquid paraffins, halogenated paraffins, dialkyl ethers, more specifically pentane, chloroform, methylene chloride and diethyl ether. To additionally facilitate contact, agitation is desirably employed, such as stirring, particularly when one of the ingredients such as catalyst is insoluble in the reaction medium.

Recovery of the epoxide product is accomplished by standard means such as filtration to remove solids followed by fractional distillation to recover the epoxide as overhead or as residue depending on its relative boiling point in respect to the boiling points of the remaining reaction residue.

In regard to the hydroperoxy alkanoate reactant, it is prepared by contacting an admixture of a second olefin as heretofore defined with ozone in the presence of the aforedefined alkanoic acid at a temperature between about −50 and 100° C. utilizing a mole ratio of second olefin to alkanoic acid between about 1:20 and 20:1 and a mole ratio of second olefin to ozone of between about 1:1 and 20:1. The formed hydroperoxy alkanoate can be isolated by standard means such as removing the excess alkanoic acid, if desired, via vacuum distillation leaving the hydroperoxy alkanoate as residue for the addition of olefin-catalyst mixture in the epoxide preparation.

If needed to facilitate contact in the alkanoate preparation, inert solvent and/or agitation can be employed in the manner and quantities described in respect to the epoxide formation.

The preparation of the hydroperoxy alkanoate reactant and epoxide product is further described by the following chemical equations:

(1) Alkanoate preparation

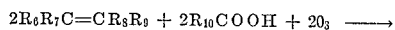
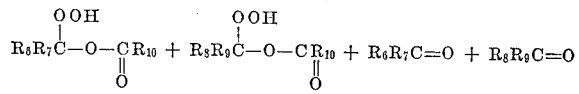

(2) Epoxide preparation

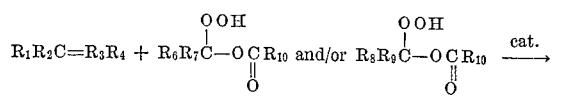

$R_1$ through $R_{10}$ are as heretofore defined.

Examples of the first and second olefin reactants contemplated herein are those characterized by the formulas $R_1R_2C=CR_3R_4$ having 5 to 13 carbons,

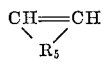

having 6 to 8 carbons and $R_6R_7=CR_8R_9$ having 5 to 12 carbons such as 1-pentene, 2-pentene, 1-hexene, cyclohexene, cyclooctene, 2-methyl-1-pentene, alpha-methylstyrene, 3-(3'-ethylphenyl)-1-propene; ortho-, meta, and para-isopropenylcumene, and 1-phenylcyclohexene.

Examples of the alkanoic acid reactants contemplated herein are ethanoic acid, isobutanoic acid, hexanoic acid and dodecanoic acid.

Example of the transitional metal epoxidation catalysts contemplated herein are molybdenum hexacarbonyl, molybdenum trioxide, molybdenum dioxide, sodium molybdate, molybdenum oxyacetylacetonate, sodium phospho-12-molybdate, phosphomolydic acid, molybdenum sulfide, silicomolybdic acid, molybdenum pentachloride, ethylphospho molybdate and tungsten and vanadium counterparts such as sodium tungstate, sodium vanadate and vanadium pentoxide.

The ozone employed is usually in admixture with oxygen or air and is advantageously present in said admixtures in amounts ranging between about 0.1 and 15 mole percent.

Specific examples of the hydroperoxy alkanoate products are those characterized by the formula:

$$R_xR_yC(OOH)-O-CR_{10}(=O)$$

where $R_{10}$ is of from 1 to 11 carbons and $R_x$ plus $R_y$ total 0 to 7 carbons such as a mixture of 1-hydroperoxy-1-phenylethyl ethanoate and 1-hydroperoxy methyl ethanoate resulting from the reaction of ozone, alpha-methylstyrene and ethanoic acid, 1-hydroperoxyheptyl ethanoate and 1-hydroperoxymethyl ethanoate derived from ozone, 1-octene and ethanoic acid and a mixture of 1-hydroperoxy-1-methylbutyl ethanoate and 1-hydroperoxymethyl ethanoate derived from ozone, 2-methyl-1-pentene and ethanoic acid.

Examples of the epoxide products produced in the method of the invention are those characterized by the formula

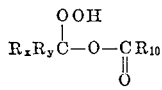

having 5 to 13 carbons and

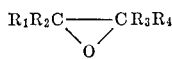

having from 6 to 8 carbons such as 1,2-octene oxide; 2,3-octene oxide; 2-methyl-1,2-pentene oxide; 1,2-cyclooctene oxide; 1,2-cyclohexene oxide; 2-methyl-2-phenyl-1,2-ethene oxide; and 5-(4'-ethylphenyl)-2,3-pentene oxide, respectively derived from 1-octene, 2-octene, 2-methyl-1-pentene, cyclooctene, cyclohexene, alpha-methylstyrene, and 5-(4'-ethylphenyl)-2-pentene.

The following examples further illustrate the method of the invention but are not to be construed as limitations thereof.

EXAMPLE I

This example illustrates the preparation of the hydroperoxy alkanoate reactant.

To a 200 ml., 3-neck flask equipped with a gas sparger, a thermometer, a water condenser and magnetic stirrer, there was charged olefin, solvent and acetic acid. The stirrer was actuated, the temperature adjusted and a stream of ozonized air (4.0 wt. percent ozone) was passed through the submerged sparger at 600 mls. per minute until a blue color resulted indicating an excess of ozone. The solvent acid was then removed via vacuum distillation leaving the hydroperoxy alkanoate product as residue. Two runs were conducted and the test data and results are reported below in Table I:

TABLE I.—TEST DATA AND RESULTS

| Run | A | B |
|---|---|---|
| Reactant, mmoles: | | |
| 2-methyl-1-pentene | 200 | |
| α-Methylstyrene | | 200 |
| Acetic acid | 167 | 200 |
| Ozone | 200 | 200 |
| Methylene chloride, mls | 100 | 100 |
| Reaction conditions: | | |
| Temp., °C | −46 | −45 |
| Time, min | 198 | 190 |
| Ozone rate, mls./min | 600 | 600 |
| Product: | | |
| Alkanoate | (1) | (2) |
| Yield, wt. g. (after stripping) | 29.9 | 39.1 |
| Wt. percent peroxide | 63 | 74 |

[1] 1-methyl-1-hydroperoxybutyl ethanoate and 1-hydroperoxymethyl ethanoate.
[2] 1-phenyl-1-hydroperoxyethyl ethanoate and 1-hydroperoxy ethanoate.

EXAMPLE II

This example illustrates the preparation of the epoxide from olefin and hydroperoxy alkanoate.

The acetic acid solution of the alkanoate adducts produced in Example I were placed in a 1-neck, 100 ml. Pyrex flask containing a magnetic stirring bar and fitted with a calcium sulfate drying tube. The olefin and catalyst were charged to the flask and the temperature adjusted and stirring instituted. Periodically, portions of the reaction mixture were removed from the flask and analyzed. At the end of the reaction, the reaction mixture was subjected to fractional distillation and the epoxide product was recovered therefrom.

The test data and results are reported below in Tables II and IIa.

TABLE II.—REACTION DATA AND RESULTS

| Run | C | D | E | F | G |
|---|---|---|---|---|---|
| Reactant ingredients (millimoles): | | | | | |
| Cyclohexene | 357 | | | | |
| Cyclooctene | | 273 | | | 273 |
| α-Methylstyrene | | | 254 | | |
| 1-octene | | | | 268 | |
| Ethanoate: | | | | | |
| A (Ex. I) | 28 | 27.9 | 28 | | |
| B (Ex. I) | | | | 17.6 | 17.6 |
| Mo(CO)₆ | 1 | 1 | 1 | 1 | 1 |
| Reaction conditions: | | | | | |
| Temp., °C | 83 | 102 | 102 | 82 | 81 |
| Wt. percent unreacted ethanoate after 4 hrs | 25 | 6 | 5 | 11 | 8 |
| Product: | | | | | |
| 1,2-oxide | (1) | (2) | (3) | (4) | (2) |
| Yield, mole percent (after 4 hrs.)⁵ | 41 | 57 | 85 | 12 | 71 |

[1] Cyclohexene oxide.
[2] Cyclooctene oxide.
[3] 2-phenylpropylene oxide.
[4] Octene oxide.
[5] Based on ethanoate.

TABLE IIa

| Run | H | I |
|---|---|---|
| Reactant ingredients, millimoles: | | |
| Cyclohexane | 372 | |
| Cyclooctene | | 276 |
| Ethanoate B (Ex. I) | 12.1 | 12.3 |
| MoO₃ | 1 | 1 |
| Reaction conditions: | | |
| Temp., °C | 81 | 99 |
| Percent unreacted ethanoate B (after 4 hours) | 37 | 12 |
| Product: | | |
| 1,2-oxide | (1) | (2) |
| Yield, mole percent (after 4 hrs.)³ | 23 | 15 |

[1] Cyclohexene oxide.
[2] Cyclooctene oxide.
[3] Based on ethanoate B.

We claim:
1. A method of preparing an epoxide of the formula:

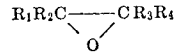

having from 5 to 13 carbons or

having from 6 to 8 carbons comprising contacting an olefin of the formula:

$$R_1R_2C=CR_3R_4$$

having from 5 to 13 carbons or

having from 6 to 8 carbons with a hydroperoxy alkanoate of the formula:

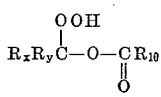

where $R_1$, $R_2$, $R_3$, $R_4$, $R_x$ and $R_y$ are hydrogen, alkyl, aryl, alkaryl or arylalkyl, $R_5$ is $\alpha,\Omega$-alkylene and $R_{10}$ is alkyl of from 1 to 11 carbons and $R_x$ plus $R_y$ total 0 to 7 carbons in the presence of a molybdenum, tungsten or vanadium epoxidation catalyst at a temperature between about 0 and 200° C. utilizing a mole ratio of olefin to alkanoate of between about 1:1 and 100:1, said catalyst being present in an amount of between about 0.01 and 10 wt. percent based on said reaction mixture.

2. A method in accordance with claim 1 wherein said hydroperoxy alkanoate is a mixture of 1-phenyl-1-hydroperoxyethyl ethanoate and 1-hydroperoxymethyl ethanoate and said catalyst is molybdenum hexacarbonyl.

3. A method in accordance with claim 1 wherein said catalyst is molybdenum hexacarbonyl and said hydroperoxy alkanoate is a mixture of 1-methyl-1-hydroperoxybutyl ethanoate and 1-hydroperoxymethyl ethanoate.

4. A method in accordance with claim 1 wherein said catalyst is molybdenum trioxide and said hydroperoxy alkanoate is 1-phenyl-1-hydroperoxyethyl ethanoate and 1-hydroperoxymethyl ethanoate.

5. A method in accordance with claim 2 wherein said olefin is 1-octene and said epoxide is 1,2-octene oxide.

6. A method in accordance with claim 4 wherein said olefin is 1-octene and said epoxide is 1,2-octene oxide.

7. A method in accordance with claim 2 wherein said olefin is cyclooctene and said epoxide is 1,2-cyclooctene oxide.

8. A method in accordance with claim 3 wherein said olefin is cyclooctene and said epoxide is 1,2-cyclooctene oxide.

9. A method in accordance with claim 4 wherein said olefin is cyclooctene and said epoxide is 1,2-cyclooctene oxide.

10. A method in accordance with claim 2 wherein said olefin is cyclohexene and said epoxide is 1,2-cyclohexene oxide.

11. A method in accordance with claim 3 wherein said olefin is cyclohexene and said epoxide is 1,2-cyclohexene oxide.

12. A method in accordance with claim 4 wherein said olefin is cyclohexene and said epoxide is 1,2-cyclohexene oxide.

13. A method in accordance with claim 4 wherein said olefin is alpha methylstyrene and said epoxide is 2-phenyl-1,2-propene oxide.

No references cited.

NORMA S. MILESTONE, Primary Examiner

U.S. Cl. X.R.

260—410.5, 410.9 R, 488 F, 592, 595, 593 A, 604 R